Dec. 10, 1968 L. ZACCARON 3,415,498
MOBILE CONCRETE MIXING EQUIPMENT
Filed Jan. 23, 1967 4 Sheets-Sheet 1

INVENTOR
LUIGI ZACCARON
ATTORNEY

Dec. 10, 1968  L. ZACCARON  3,415,498
MOBILE CONCRETE MIXING EQUIPMENT
Filed Jan. 23, 1967  4 Sheets-Sheet 3

INVENTOR
LUIGI ZACCARON

ATTORNEY

United States Patent Office 3,415,498
Patented Dec. 10, 1968

3,415,498
MOBILE CONCRETE MIXING EQUIPMENT
Luigi Zaccaron, Via Nazionale, S. Caterina, Udine, Italy
Filed Jan. 23, 1967, Ser. No. 610,968
Claims priority, application Italy, Oct. 15, 1966,
55,691/66
3 Claims. (Cl. 259—165)

ABSTRACT OF THE DISCLOSURE

A mobile concrete mixing equipment with the various apparatus forming the equipment being predisposed on one or more vehicles, ready for being mounted in situ and for automatic operation. The equipment comprises a framework forming a trailer and provided with wheel sets adapted to be easily mounted and dismounted to enable the framework to be readily and quickly installed on and removed from a site, and a cement silo mounted on a truck so as to be easily removed therefrom and attached to the framework. A square supporting frame is arranged at the front end of said framework to support a basin type balance adapted to be emptied automatically. At least two laterally radially movable bucket conveyors are pivotally mounted on the supporting frame so as to be movable through an angle of about 180°. A conveyor belt extends with one of its ends below the balance and with its other rearward end between the bucket conveyors. A drum concrete mixer is disposed at the rear end of the framework between the bucket conveyors.

---

The present invention relates to a mobile concrete mixing equipment in which the various apparatus forming the equipment is arranged on vehicles, ready for being mounted in situ.

It is an object of the present invention to provide a mobile concrete mixing equipment adapted to be transported on vehicles and so predisposed as to permit ready and easy mounting of the equipment on the site in the shortest possible time.

It is a further object of the present invention to provide a mobile concrete mixing equipment which, after having been mounted in situ, works completely automatically with complete synchronization of all operations.

These and other objects of the invention are obtained by the provision of a mobile concrete mixing equipment in which the various apparatus forming the equipment is disposed on successive vehicles, ready for being mounted on the site, the equipment including a cement silo adapted for transportation by a truck while the rest of the apparatus is mounted on a framework equipped with wheel sets forming a trailer and designed to be removed during assembly.

A system for erecting a cement silo carried by a truck, on a supporting frame fixed on the ground is already known, in which a device including a worm and a hand crank is used for the erection of the silo. The worm is articulated to two legs of the silo and two legs of the supporting frame which in turn is anchored, with its two remaining legs, to the other legs of the silo so that the worm together with the supporting frame and the legs forms the framework for the erection of the silo.

A basin type balance for weighing the aggregates and with automatic emptying of the basin on an associated conveyor belt forming the closure at the bottom of the basin is also already known. This balance is connected to an appropriate electric apparatus located in the balance head so as to permit the automatic loading of the balance with cement and the aggregates (gravel, sand) supplied by bucket conveyors and the discharge of these materials on to a conveyor belt.

There is further known a bucket conveyor mounted on a movable cantilever arm articulated to a supporting frame and oscillable about a fulcrum by means of a suitable device, with the chain carrying the buckets moving in the plane of taking up the aggregates in a position parallel to this plane. With this conveyor the device for lateral orientation of the cantilever arm produces an automatic oscillating movement of this arm toward the material to be collected, by exerting a constant pressure directed transversely of the direction of movement of the arm toward the heap of the material to be collected or aggregate, thus ensuring an automatic loading operation.

Finally, the conventional drum concrete mixer is also known.

All this known apparatus, except the drum concrete mixer, forms the object of prior patent applications filed by the applicant of the present invention.

The present application is more particularly concerned with the combination, coordination and disposition of the four known apparatuses mentioned above in a form which, by a few simple manipulations, permits their transportation on roads as well as a completely automatic and coordinated operation after completion of assembly of the equipment.

A preferred embodiment of the invention will now be described by way of example and with reference to the accompanying drawings, in which.

Figure 1:
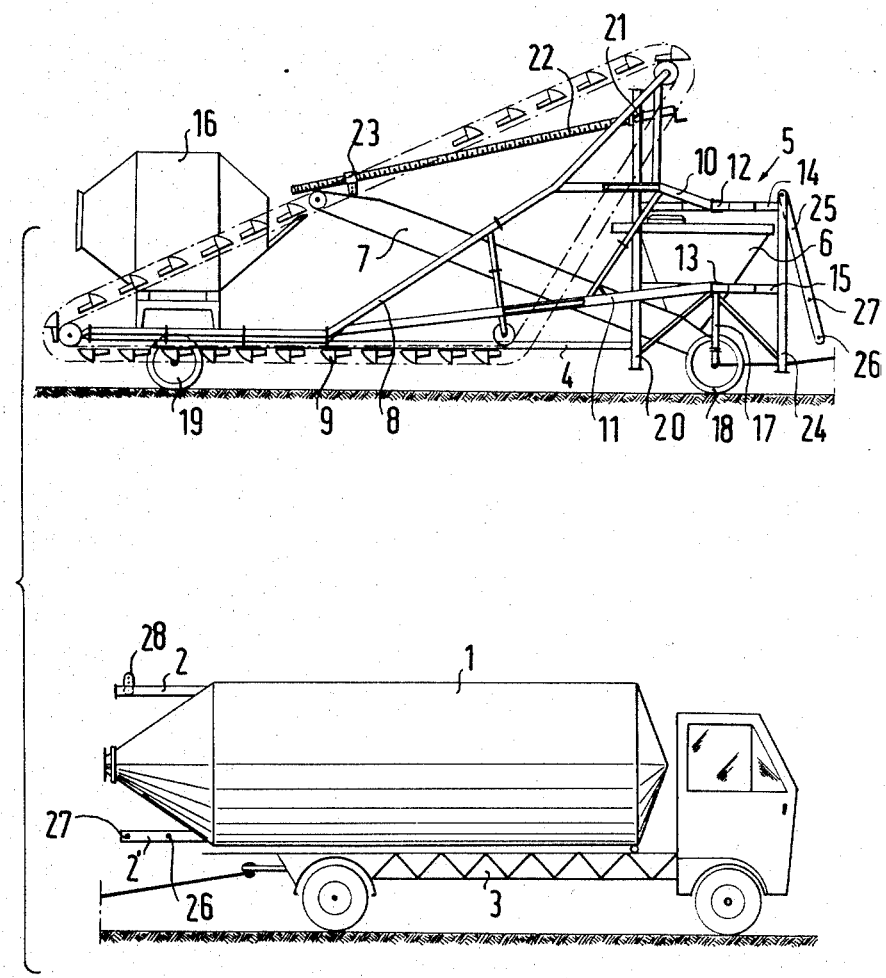
FIG. 1 is a side view of the equipment proposed by the invention as mounted on a truck and a trailer, the equipment including in this embodiment two bucket conveyors and a silo mounted on the truck while the trailer is composed of a framework provided with two wheel sets and carrying the rest of the apparatus.
Figure 2:
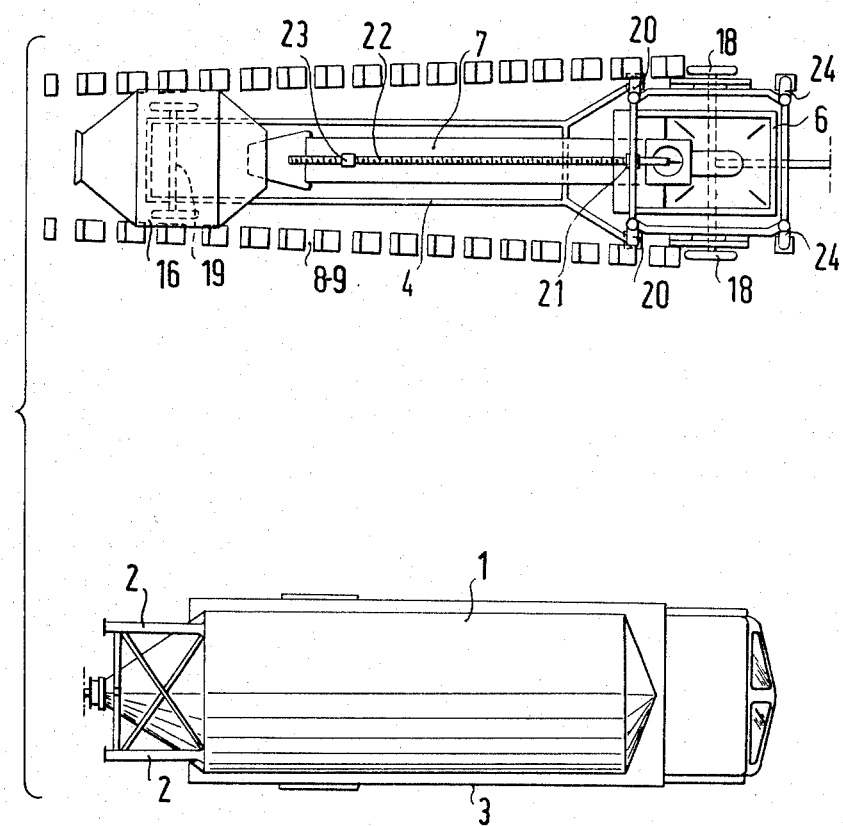
FIG. 2 is a top plan view of FIG. 1.

As shown more particularly in FIG. 1, the equipment comprises a silo 1 with four legs 2 and 2' and adapted to be transported on a truck 3 arranged to pull a framework 4 carrying at its front end a square supporting frame 5 accommodating therein a balance with a basin 6 adapted to be emptied automatically. A conveyor belt 7 is disposed below the balance and at its rear extends between two bucket conveyors 8 with buckets 9 mounted on chains arranged for continuous movement. Each of the bucket conveyors 8 is provided with movable arms 10 and 11 pivoted at 12 or 13 respectively, to two horizontal bars 14 and 15 of the supporting frame 5. A drum concrete mixer 16 is disposed rearwardly between the bucket conveyors.

An upright 17 is centrally mounted on the horizontal bar 15 below the supporting frame 5 and carries a front wheel set 18 while a rear wheel set 19 is located below the drum concrete mixer 16.

Of the four legs forming the supporting frame, the rear ones 20 are secured to the framework 4 and extend from the horizontal bar 14, terminating in a support 21 serving for free rotatable support of a worm 22 carrying a female screw or nut 23. The shorter front legs 24 carry at their top ends swingable arms 25 designed for connection to the legs 2' of the silo 1 by insertion of bolts into mutually corresponding holes 26 and 27 in the legs 24 and 2' when the worm 22, after having been tilted, engages with its female screw 23 an extension 28 on the legs 2 and is connected therewith during the erection of the silo.

Figure 3:
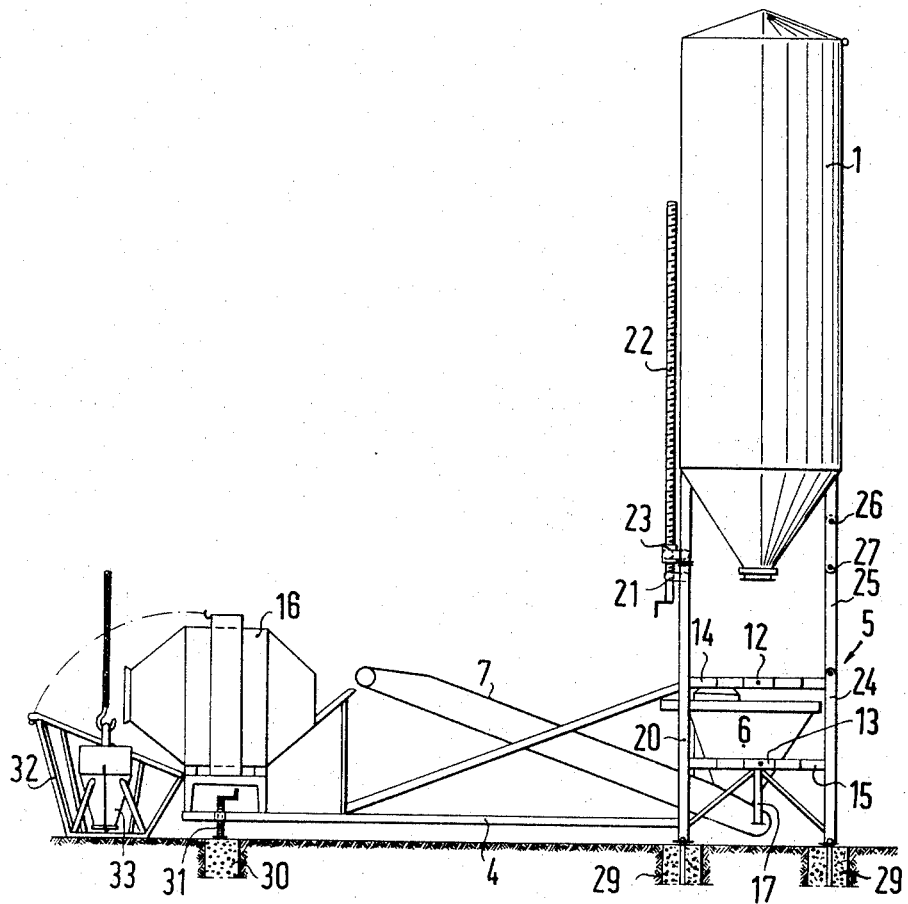
FIG. 3 is a side view of the equipment mounted ready for operation, the silo being erected on a supporting frame and the two bucket conveyors being not shown.
Figure 4:
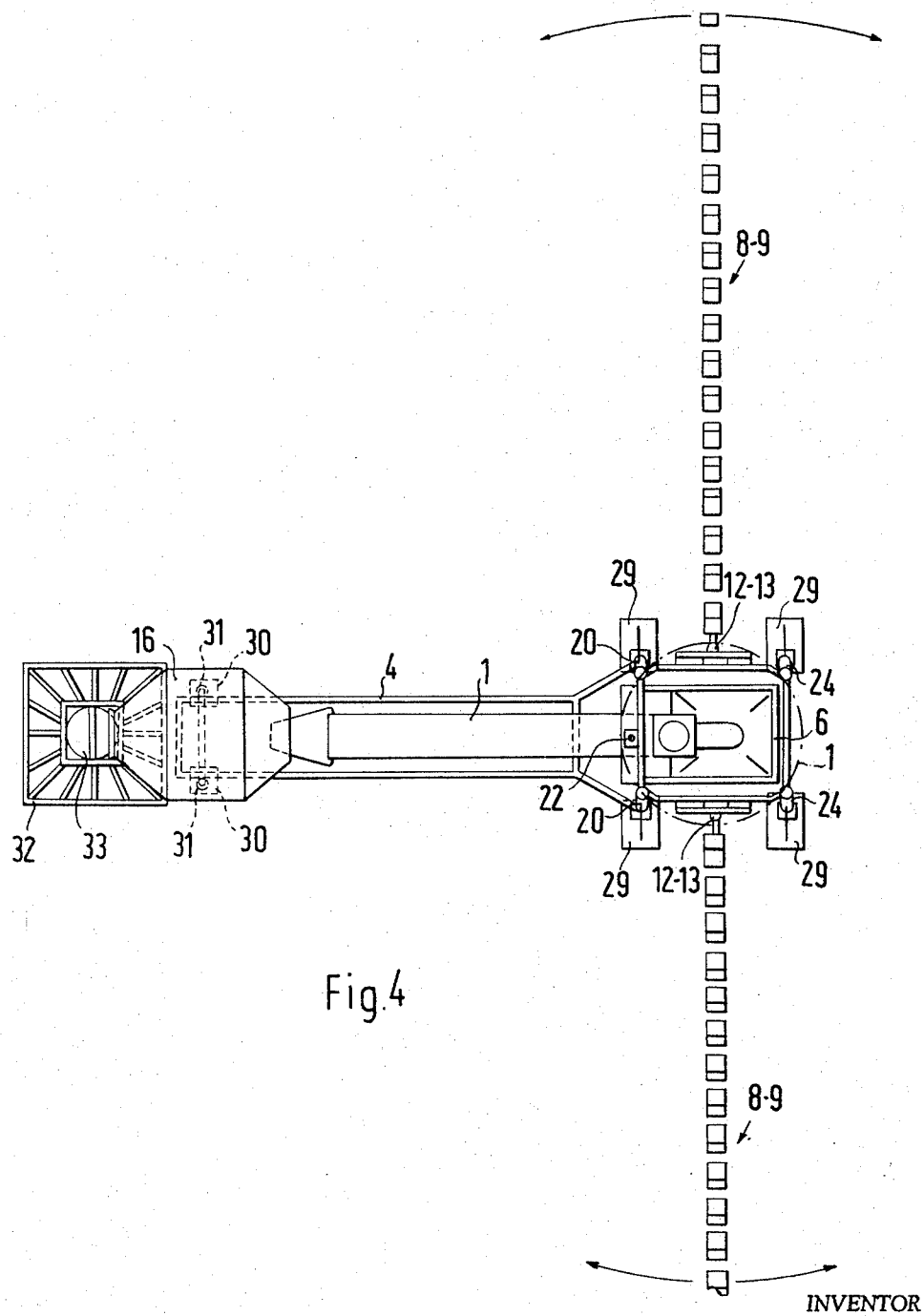
FIG. 4 is a top plan view of FIG. 3.

The trailer thus formed is adapted for road transportation and after it has been pulled to the site by the truck 3, its wheel sets 18 and 19 are removed (FIGS. 1 and 3) and the framework 4 is deposited on a plurality of socles previously prepared on the ground. To four of these socles, designated by 29, the legs 20 and 24 of the supporting frame 5 are secured, on which the silo 1 is erected as described above (FIG. 3) while a supporting jack 31 is lowered on to the other two socles 30 located in the region of the rear axle. After the bucket conveyors 8 have been positioned with their radially scraping buckets 9 as shown in FIG. 4, the operation of loading the two heaps of aggregates on the left and right previously prepared (not shown) by oscillating the conveyors 8 can be started.

The electric control of the drum concrete mixer 16 is connected to the electric control for the admission of the water into the concrete mixer. Furthermore, the electric controls of the concrete mixer and of the balance, which in turn actuate the bucket conveyors and control the feeding of the cement from the silo, are so coordinated that it is sufficient to press a single push button to obtain each single concrete mixture. The actuation of this push button then automatically produces the following operations:

(a) Tilting of the drum concrete mixer 16 and emptying of the concrete already mixed in the previous cycle;

(b) Reversal of the direction of rotation of the concrete mixer drum by means of a reversing switch after the discharge and starting of the motor for the admission of the water simultaneously with the starting of the motor for the conveyor belt 7 of the balance 6 already loaded in the preceding cycle;

(c) Actuation of an electric contact when the balance 6 is empty and the pointer on the dial indicates zero by means of a photoresistance and starting of loading of the balance with the feeding of the cement from the silo by means of an electric valve and then, when the pointer on the dial of the balance indicates the desired weight, another actuation of the electric contact which stops the electric valve and starts a bucket conveyor which, after having conveyed the desired quantity of material, stops by the same effect previously described, and starting of the second bucket conveyor which supplies the other type of material, and then stopping of the entire plant. If the different aggregates to be loaded were four instead of two, the bucket conveyor, still under the control of the electric equipment, would move radially for loading the respective aggregates first on the right and then on the left and vice versa. All the cycles are obtained as explained above.

The electric push button for starting the cycle can be located either directly on the equipment or remote therefrom and the electric control acted upon by said push button may be connected to a guiding device 32 for a bucket 33 of a crane (not shown) so as to place the bucket 33 into the right position with respect to the mouth of the drum concrete mixer 16. When the bucket 33 is then placed in position by the crane for being filled with concrete, it will trigger by its own weight the device for reversing the direction of rotation of the concrete mixer and thereby empty the latter into the bucket 33. In this way a fully automatic operation of the equipment is obtained.

Although the electric control and operation equipment for the various apparatus has not been described and illustrated, it is obvious that this equipment can be chosen from the types known without departing from the scope of the invention.

I claim:
1. Mobile concrete mixing equipment comprising
   a framework provided with wheel sets and forming a trailer, said wheel sets being adapted to be easily mounted and dismounted to enable said framework to be readily and quickly installed on and removed from a site,
   a cement silo mounted on a truck so as to be easily removed therefrom and attached to said framework,
   a square supporting frame at the front end of said framework for supporting a basin type balance adapted to be emptied automatically,
   at least two laterally radially movable bucket conveyors pivotally mounted on said supporting frame and movable through an angle of about 180°,
   a conveyor belt extending with one of its ends below said balance and with the other rearward end between said bucket conveyors, and
   a drum concrete mixer disposed at the rear end of said framework between said bucket conveyors.

2. Equipment as claimed in claim 1, wherein the supporting frame carries a worm type device for the erection of the cement silo on said supporting frame and swingable arms are mounted on said supporting frame to assist in the erection of the cement silo, which is effected by the combined action of the worm and the arms so as to straighten the legs of the silo abruptly.

3. Equipment as claimed in claim 1, wherein the framework forming the trailer, after the wheel sets have been removed therefrom, forms part of the apparatus of the equipment and is used for mounting the equipment on the site.

References Cited
UNITED STATES PATENTS

| | | | |
|---|---|---|---|
| 2,112,326 | 3/1938 | Berner | 259—153 |
| 3,249,343 | 5/1966 | Siebeneicher | 259—154 |

FOREIGN PATENTS

| | | |
|---|---|---|
| 1,370,103 | 7/1964 | France. |

ROBERT W. JENKINS, *Primary Examiner.*